(12) United States Patent
Pannwitz

(10) Patent No.: US 6,687,103 B2
(45) Date of Patent: Feb. 3, 2004

(54) CHARGE/DISCHARGE PROTECTION CIRCUIT

(75) Inventor: Axel Pannwitz, Lenningen (DE)

(73) Assignee: Dialog Semiconductor GmbH, Kirchheim (DE)

(*) Notice: Subject to any disclaimer, the term of this patent is extended or adjusted under 35 U.S.C. 154(b) by 39 days.

(21) Appl. No.: 10/210,958

(22) Filed: Aug. 2, 2002

(65) Prior Publication Data

US 2003/0025480 A1 Feb. 6, 2003

(51) Int. Cl.[7] .............................................. H02H 3/20
(52) U.S. Cl. ........................ 361/90; 361/93.1; 361/56
(58) Field of Search .......................... 361/90, 88, 93.1, 361/103, 104, 56, 57

(56) References Cited

U.S. PATENT DOCUMENTS 5,554,919 A * 9/1996 Uchida ...................... 320/132
5,703,463 A * 12/1997 Smith ........................ 320/134

* cited by examiner

Primary Examiner—Stephen W. Jackson
Assistant Examiner—James Demakis
(74) Attorney, Agent, or Firm—George O. Saile; Stephen B. Ackerman

(57) ABSTRACT

The invention refers to a charge/discharge protection circuit for a rechargeable battery, where the protection circuit is integrated on a single chip, including the fusible link, the load current switch and the short-circuit switch. This is achieved by dividing the functions of the fusible link, the load current switch, and the short-circuit switch into in parallel arranged T-sections, each of which is designed for only a fraction of the nominal load so that each of the easily integrated fuse segments carry only the respective fraction of the nominal current. It is important that the entire protection circuit or its control logic will not be destroyed before through an unduly high over-voltage, in which case the sequential melting of the fuse segments would no longer be guaranteed. This is handled by a semiconductor switch which short-circuits the over-voltage immediately.

26 Claims, 5 Drawing Sheets

CHARGE/DISCHARGE PROTECTION CIRCUIT

RELATED PATENT APPLICATION

Figure 1:
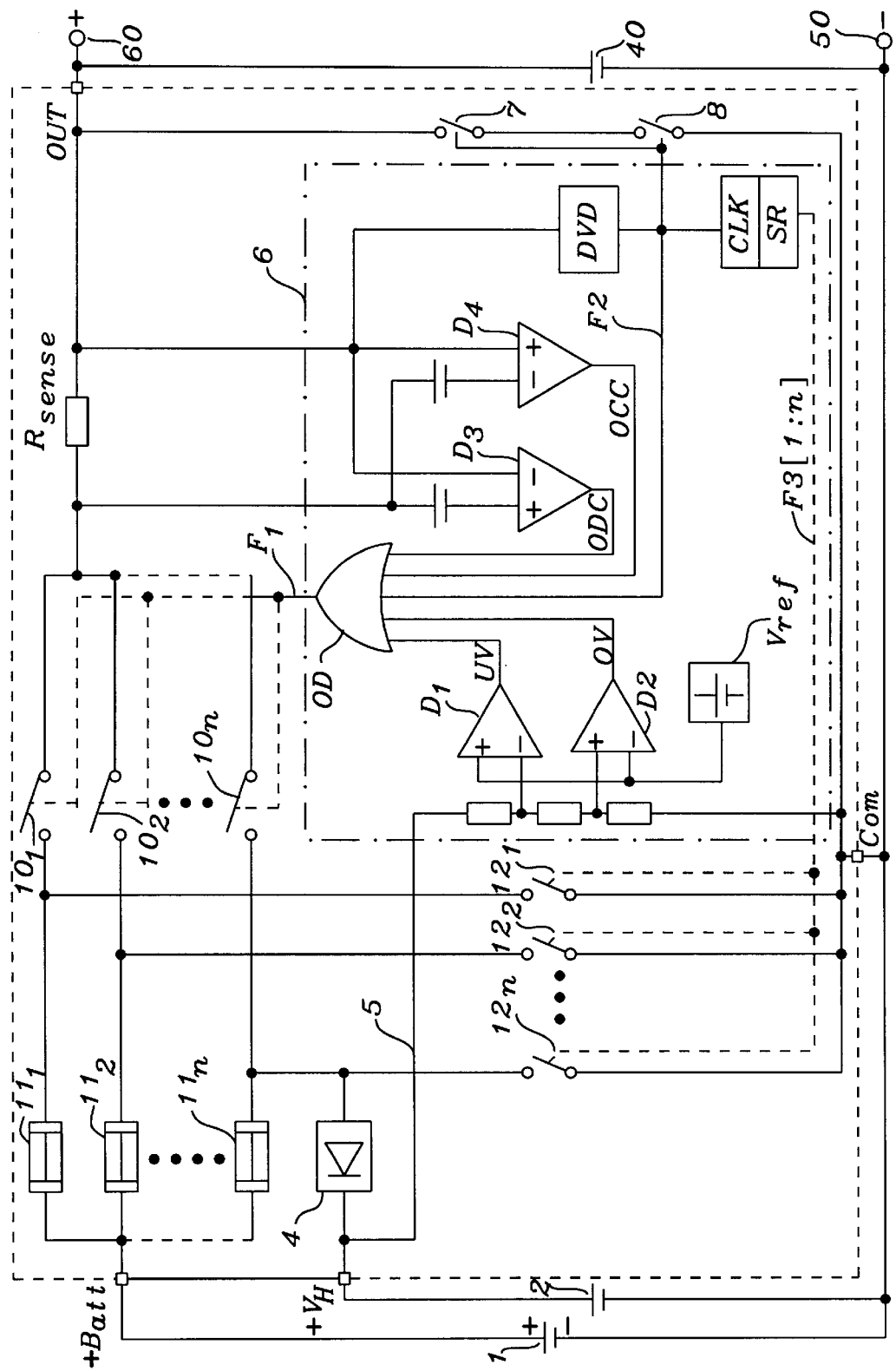

DS01-036, Charge/Discharge Protection Circuit for a Rechargeable Battery, title filing date: Jan. 24, 2002. Ser. No. 10/057490, assigned to a common assignee.

The invention refers to a charge/discharge protection circuit for a rechargeable battery comprising at least one rechargeable cell, with a control logic which opens or closes a load current switch depending on the magnitude of the voltage at the battery terminals, the voltage at the charge/discharge terminals of the protection circuit, and the charge or discharge current. Where that control logic comprises an over-voltage detector which produces a control signal when reaching a voltage limit which depends on the electric strength as determined by the protection circuit. This control signal closes a short-circuit switch which connects the battery terminals via a load current switch in series with a fusible link.

Such a circuit is deemed known from the above referenced Related Patent Application, which is expressly referenced herewith. In particular, this circuit can be disposed between a single lithium-ion cell and the electronics of a mobile phone. It can be produced at favorable cost with a significantly lower electric strength than inherently required in a worst case, because the short-circuit switch closes when reaching an appropriately determined voltage limit. The resulting short circuit current thus safely destroys the fusible link so that the cell is protected from a dangerous overcharge. In contrast to all other circuit elements however, the fusible link cannot be integrated in an IC or only at high cost, because it has to respond very reliably at a tightly toleranced nominal current.

The task of this invention is based on the requirement to create a protection circuit of the above described type which can be integrated on a single chip including the fusible link.

This task is inventively solved, in a first preferred embodiment, by designing a series circuit comprising the load current switch and the fusible link for a fraction 1/n of the nominal current and shunting n of such series circuits in parallel, that the short-circuit switch consists of n switch segments, each of which coupled between the node of the load current switch and the fusible link of the series circuit x (x=1, 2. . . n) and the opposite battery connection, that the over-voltage detector creates in sequential succession for each circuit segment x a separate control signal, and that there is disposed a semiconductor switch in parallel to the charge/discharge terminals of the protection circuit, which the over-voltage detector switches conductively when reaching the predetermined voltage limit.

The central idea of the invention is, therefore, to create the condition where the fuse segments in the case of an over-voltage are reliably destroyed and where the destruction proceeds sequentially from the first to the last fuse segment. This is achieved by dividing the functions of the load current switch, the fusible link, and the short-circuit switch into in parallel arranged T-sections, each of which is designed for only a fraction of the nominal load so that each of the easily integrated fuse segments carry only the respective fraction of the nominal current. It is important in this case that the entire protection circuit or its control logic will not be destroyed before through that unduly high over-voltage, in which case the sequential blowing of the fuse segments would no longer be guaranteed. This is taken care of by the semiconductor switch which immediately short-circuits a recognized over-voltage.

Appropriately, the over-voltage detector receives as input voltage the potential at the charge/discharge terminals. In general, the over-voltage detector could equally well receive as input voltage the voltage from the parallel circuit of the, in the event of an over-voltage, now opened load current switch.

Appropriately, at least those circuits components of the control logic generating the control signals for the switch segments receive their supply voltage from an auxiliary voltage source, in particular from a charged buffer capacitor. This safeguards the function of the protection circuit when the outer over-voltage is short-circuited by the semiconductor switch or if it is so high that it has lead to a destruction of other intended parts of the control logic.

The over-voltage detector may in particular comprise a bistable flip-flop circuit, which switches to its second stable state when the predetermined voltage limit is reached, so that the sequential closing of the switch segments of the short-circuit switch is initiated when the predetermined voltage limit is reached during even a brief interval.

The over-voltage detector may comprise a clock generator followed by a shift register of at least n levels, which, when reaching the predetermined voltage limit, delivers sequentially the control signals for the switch segments of the short-circuit switch.

In a second preferred embodiment of this method of producing the control signals, it is possible that each switch segment of the short-circuit switch has associated with it a voltage detector, which delivers a signal at its output when the voltage at this switch segment disappears as a result of the melting of the associated fuse segment and that the outputs of the voltage detectors are coupled to a logic circuit which comprises a clock generator and which, when exceeding the voltage limit, produces the control signal for the next in line switch segment only when the voltage detector of the preceding switch segment delivers an output signal. The logic circuit can be realized, specifically, with an appropriate number of sequentially connected and with each other coupled flip-flops, as is well understood by those skilled in the art, or an appropriate number of short shift registers. Utilizing shift registers has the advantage in this instance that the control signals do not follow each other immediately, but have a short delay determined by the frequency of the clock generator and the number of shift registers, thus allowing the current path created by the prior melting of the fuse segment to cool down.

In a third preferred embodiment (not shown), the semiconductor switch and/or the switch segment of the short-circuit switch may comprise two in series connected, parallel controlled single switches, in order that this component may also be realized in a low-cost technology offering only lower electric strength.

All circuit components, with the exception of capacitors, are preferably integrated on a chip.

Embodiments of a protection circuit according to the present invention are shown schematically simplified in the drawings. Illustrated is:

FIG. 1 a block diagram of a first embodiment

Figure 2:
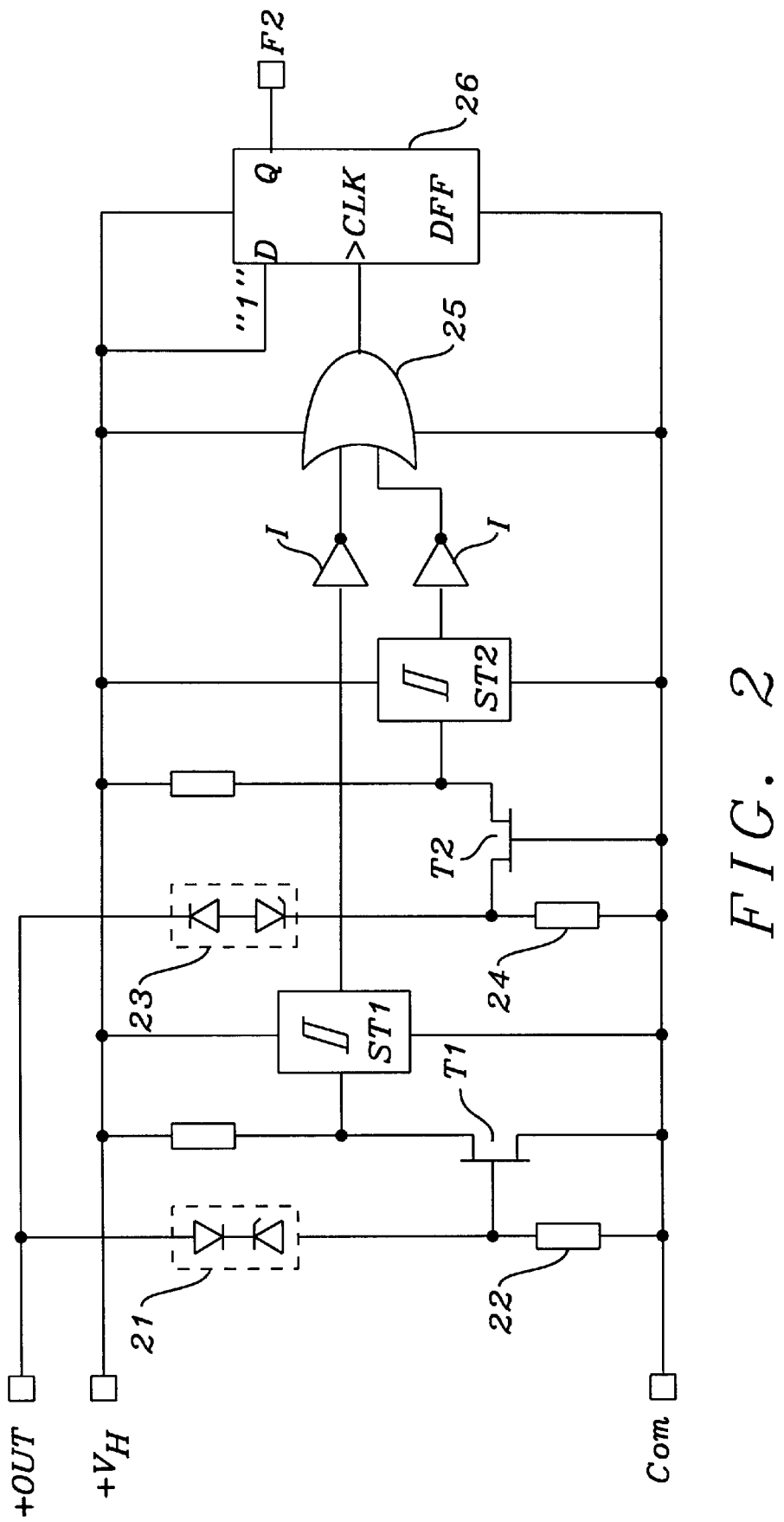
Figure 3:
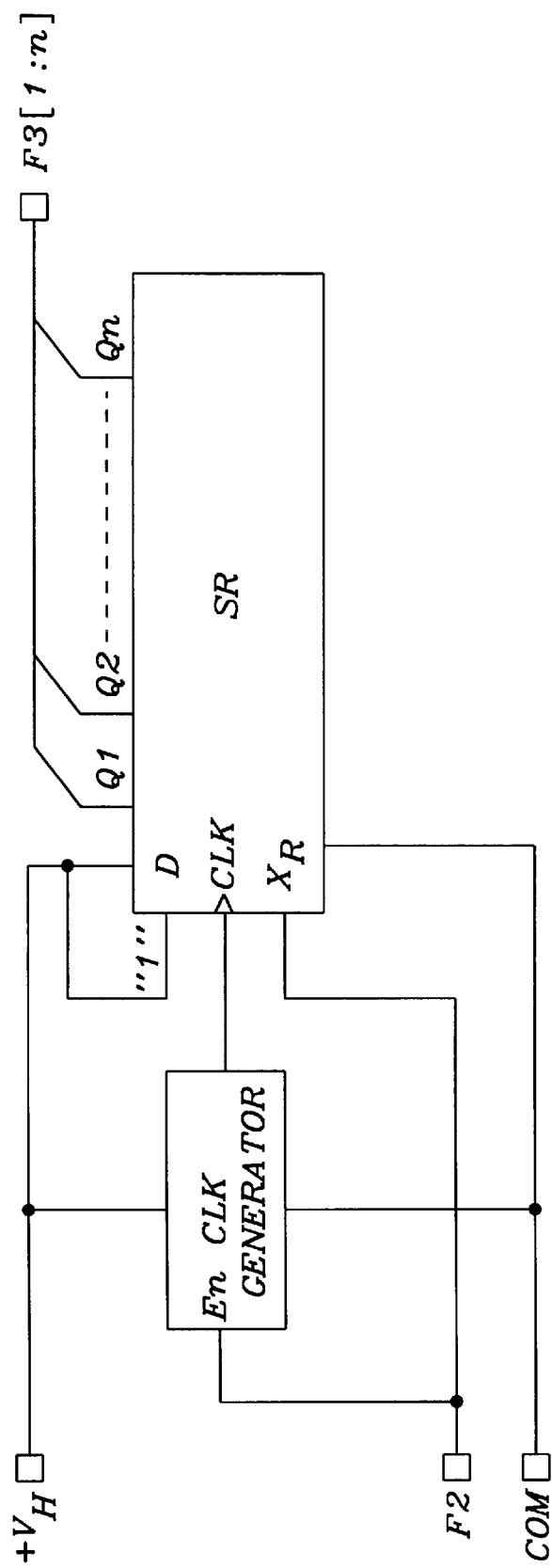
Figure 4:
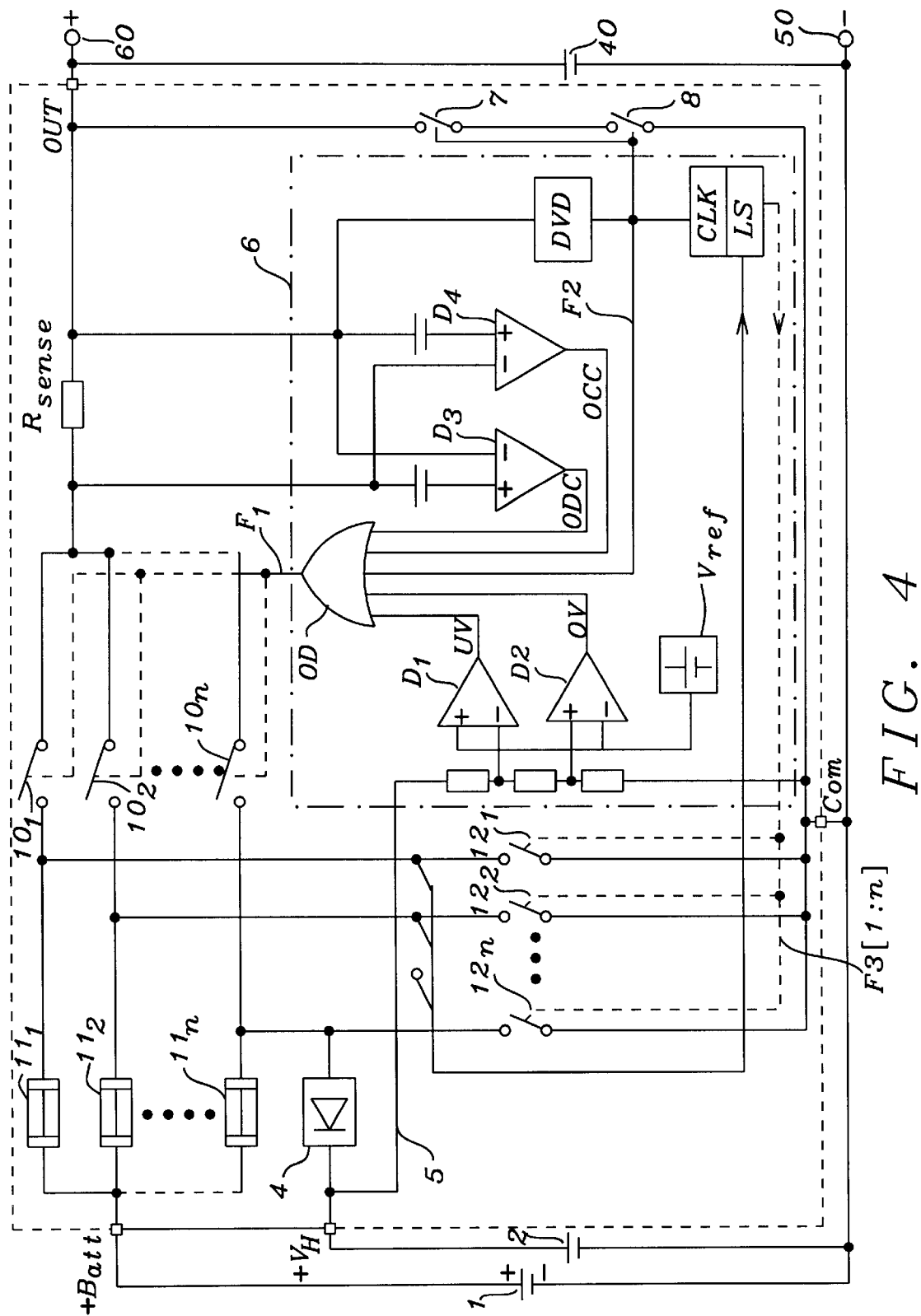
Figure 5:
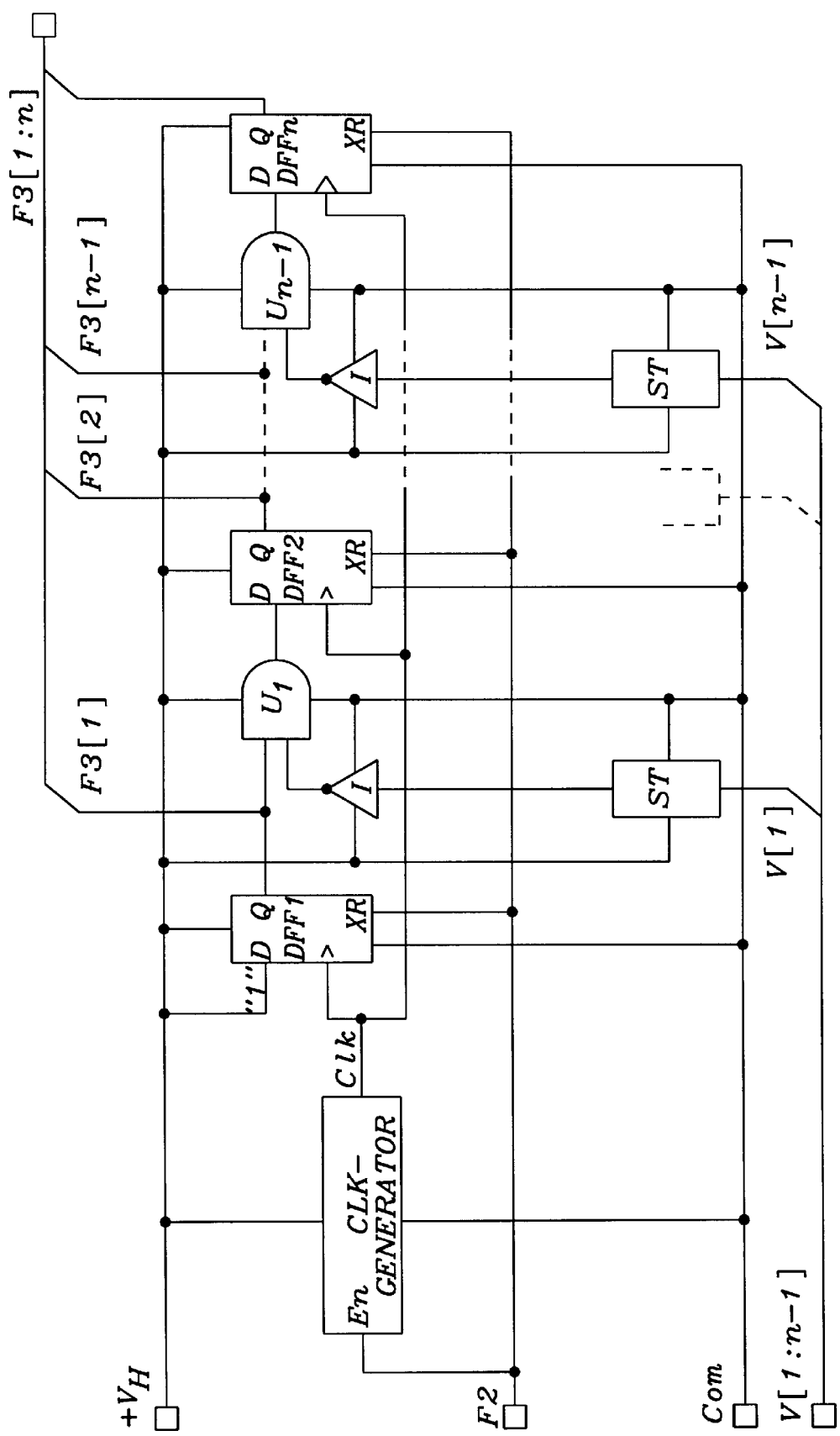

FIG. 2 a simplified circuit diagram of the over-voltage detector in FIG. 1, FIG. 3 a simplified circuit diagram of the clock generator and shift register in FIG. 1, FIG. 4 a block diagram of a second embodiment, and FIG. 5 a simplified circuit diagram of the logic circuit in FIG. 4.

The protection circuit illustrated in FIG. 1 is located as an integrated circuit between the terminals of a Li-Ion cell 1 and two charge/discharge terminals 50 and 60, paralleled to which is a filter-capacitor 40 as protection against steeply sloped voltage increases. The protection circuit has the outer connections Com, +Batt and Out as well as $+V_H$. The latter is connected via a buffer capacitor 2 with the reference potential Com. Buffer capacitor 2 is normally charged to the battery voltage via semiconductor switch 4 (indicated as a diode). If this supply voltage drops away then semiconductor switch 4 opens and the buffer capacitor 2 supplies, via line 5, power for a time for essential parts of the integrated circuit. A charge pump circuit may also be used in place of semiconductor switch 4, where the charge pump circuit charges the buffer capacitor 2 to the intended maximum gate voltage as dictated by the technology of the integrated circuit.

A current sensing resistor $R_{sense}$ is placed between Out and +Batt in series with a circuit arrangement, which comprises a plurality of parallel coupled series circuits, in turn each comprising a load current switch $10_1, 10_2, \ldots 10_n$ and an integrated fusible link $11_1, 11_2, \ldots 11_n$. Each connection node between a load current switch $10_x$ and a fusible link $11_x$ is connected to the reference potential Com via its own short-circuit switch $12_1, 12_2, \ldots 12_n$.

A control logic, pictured in simplified form within dash-dotted block 6, generates by generally known means through differential amplifiers D1 and D2 a battery under-voltage signal UV and a battery over-voltage signal OV, provided the voltage of the Li-Ion cell is outside of the predetermined tolerance range. The control logic further generates from the voltage drop across $R_{sense}$ by means of differential amplifiers D3, D4 the output signals ODO, OCC, respectively, when reaching the maximum discharge current or the maximum charge current, respectively. Output signals UV, OV, ODO and OCC of differential amplifiers D1 to D4 are coupled into OR-gate OD which supplies an output signal F1 which opens in each of the mentioned cases all load current switches $10_1$ through $10_n$.

The voltage $V_{out}$ is applied at the same time to the input of an over-voltage detector OVD which generates an error signal F2 in case of an over-voltage. Error signal F2 also closes at the same time two semiconductor switches 7, 8 which are connected in series between Com and Out, generates via OR-gate OD the error signal F1 to open the load current switches $10_1$ through $10_n$, and activates a clock generator CLK. Coupled to the clock generator CLK is a shift register SR which then sequentially delivers error signals F3 [1:n] for successive closing of the short-circuit switches $12_1$ through $12_n$. This has the consequence that, one after the other, fuses $11_1$ through $11_n$ blow, so that Li-Ion cell 1 will be cut off from Out after a few milliseconds to a few 100 milliseconds. At least until the last fuse $11_n$ has blown, control logic 6 will be fed by the buffer capacitor 2, if necessary.

FIG. 2 illustrates an embodiment of the over-voltage detector. The designations of the outer connections correspond with those of FIG. 1. Placed between Out and Com is a series circuit comprising first trigger element 21 and a resistor 22 as well as a second trigger element 23 and a second resistor 24. Trigger elements 21, 23 are only illustrated symbolically as the series connection of a zener diode and a back current diode wired back-to-back. When exceeding the predetermined voltage limit in the positive or negative direction the corresponding trigger element becomes conductive and with it the respective, following MOS transistor T1 or T2, which in turn sets to "0" or "L" the following Schmitt-Trigger ST1, ST2, respectively. The outputs of the Schmitt-Triggers are coupled via Inverter I with the inputs of a NAND-gate 25, whose output in turn is connected with the clock input of a D flip-flop 26. Its D-input is normally at "1" or "H". The output Q of flip-flop 26, therefore, goes to "H" when at the clock input an impulse arrives from OR-gate 25. The over-voltage detector behaves, therefore, like a bistable flip-flop. The output signal "H" represents the signal F2.

FIG. 3 illustrates clock generator CLK with the shift register SR coupled to it as shown in FIG. 1. Clock generator CLK is started when signal F2 is applied to its start input EN and supplies at its output clock pulses clk, which are applied to the clock input of shift register SR. At the same time the latter receives at its signal input XR the signal F2 and at its D-input the signal "1" or "H". Shift register SR outputs $Q_1$, $Q_2, \ldots Q_n$, equal to signal F3 [1:n], thus switch sequentially from "L" to "H" in accordance with the clock signal, thereby delivering sequentially following control signals for closing of the switch segments $12_1$ through $12_n$ in FIG. 1.

FIG. 4 illustrates a block diagram of a fourth preferred embodiment of the protection circuit. Having a similar arrangement as the embodiment of FIG. 1, it differs from that because voltages $V_1$ through $V_{n-1}$ picked off at the short-circuit switches $12_1$ through $12_n$ are selected and then supplied to a logic circuit LS, replacing the shift register SR of FIG. 1.

This logic circuit LS supplies sequentially the control signals F3 [1:n] and is illustrated in FIG. 5. It receives those in FIG. 4 named voltages or signals and includes for each switch segment $12_1$ through $12_n$, respectively the voltages $V_1$ through $V_{n-1}$ picked off from each, a voltage detector ST illustrated as a Schmitt-Trigger, and a number of D-flip-flops $DFF_1$ through $DFF_n$ whose number equals the number of switch elements. The clock generator CLK, preferably operating at a higher frequency than the one of FIG. 1, will be started by signal F2, like before and delivers clock signals clk to the clock input of $DFF_1$ to DFFn. Because error signal F2 is applied at the same time to all inputs XR of the D-flip-flops, thereby enabling it, the first clock pulse CLK forces output Q of $DFF_1$ to "1" and thereby generates the first control signal F3 [1] which closes switch segment $12_1$. As long as its own fuse segment $11_1$ is still intact, the voltage $V_1$ is then >0 V (typically 0.5 to 1.5 V). The corresponding voltage detector therefore supplies an output signal "1". When fuse $11_1$ is melted a short time after the closing of the switch segment then the voltage switches to $V_1<0.5$ V. The output signal of the voltage detector goes to "0". The following inverter I generates out of it a "1" for the second input of AND-gate $U_1$. Applied to the first input is signal F3 [1], so that the output of the AND-gate also switches to "1". This output is coupled to the D-input of the next flip-flop $DFF_2$, which, in similar manner, with the next rise of the clock signal clk supplies the control signal F3[2] etc..

A further preferred embodiment (but not illustrated in the drawings) consists in replacing each of the flop-flops DFF by a short shift register, e.g. with three successive, appropriately coupled D-flip-flops. Thus, each control signal will be generated after a time delay of e.g. three clock cycles, after the voltage $V_x$ at the respective switch element has dropped due to the melting of the respective fuse element. During this time delay the current path of the just before melted fuse element can cool down. This method avoids having a retroactive effect on the response characteristics of the physically closely spaced next and still intact fuse element.

Should, in the meantime, the current path of this fuse element become again conductive when the before melted-away metal, typically aluminum, solidifies, then this would be recognized by its own voltage detector in the same manner as before and a new blowing of this fuse element would be initiated. This further increases the reliability of the protection function of the total circuit.

While the invention has been particularly shown and described with reference to the preferred embodiments thereof, it will be understood by those skilled in the art that various changes in form and details may be made without departing from the spirit and scope of the invention.

What is claimed is:

1. A charge/discharge protection circuit for a battery comprising
   a protection circuit having a first, a second, a third, and a fourth terminal, where said first and said second terminal are coupled to the battery terminals of at least one rechargeable cell, respectively, where said second and said third terminals are coupled to the charge/discharge terminals of an external device, and where said second and said fourth terminal couple to a buffer capacitor, said protection circuit protecting said rechargeable cell from an over-voltage applied at said battery terminals, said protection circuit further comprising:
      a control logic, which opens or closes a load current switch depending on the magnitude of the voltage at said battery terminals, the voltage at said charge/discharge terminals of said protection circuit, and the charge or discharge current at said second and said third terminals, where said control logic comprises an over-voltage detector, which generates control signals when reaching a predetermined voltage limit, said predetermined voltage limit depending on the electric strength as determined by said protection circuit, where said control signals close a short-circuit switch, which connects said battery terminals via a fusible link in series with a load current switch;
      a series circuit comprising said load current switch, ranging in numbers from 1 to n, and a fusible link, ranging from 1 to n, having at the junction of said load current switch and said fusible link a node T, ranging from 1 to n, where n of such series circuits are shunted in parallel, ranging in numbers from 1 to n, and where said load current switch and said fusible link are designed for a fraction 1/n of the nominal current;
   said short-circuit switch comprising n switch segments, ranging in numbers from 1 to n each of said switch segments, 1 to n, coupled between a respective node T, 1 to n, and said battery terminal Com;
   said over-voltage detector creating for each of said switch segments, 1 to n, in sequential succession said control signals, ranging in numbers from 1 to n; and
   serially coupled first and second semiconductor switches, disposed in parallel between said Out and said Com terminals, conductively switched by said over-voltage detector when said over-voltage detector reaches said predetermined voltage limit.

2. The charge/discharge protection circuit of claim 1, wherein said over-voltage detector receives as input potential the voltage at said charge/discharge terminals.

3. The charge/discharge protection circuit of claim 1, wherein at least those circuits components of said control logic which generate said control signals for said short-circuit switches receive, via said fourth terminal, their supply voltage from an auxiliary voltage source.

4. The charge/discharge protection circuit of claim 3, wherein said auxiliary voltage source is charged via a third semiconductor switch to the battery voltage, where said third semiconductor switch opens when said battery voltage falls below a predetermined value.

5. The charge/discharge protection circuit of claim 4, wherein said third semiconductor switch opens when said over-voltage detector produces control signals upon exceeding said predetermined voltage limit.

6. The charge/discharge protection circuit of claim 4, wherein said auxiliary voltage source is charged via a charge pump to the maximum allowable gate voltage for said control logic.

7. The charge/discharge protection circuit of claim 4, wherein said auxiliary voltage source is a buffer capacitor.

8. The charge/discharge protection circuit of claim 1, wherein said over-voltage detector comprises a bistable flip-flop circuit which switches from a first stable state to a second stable state when said predetermined voltage limit is reached.

9. The charge/discharge protection circuit of claim 1, wherein said over-voltage detector is coupled to a clock generator followed by a shift register, of at least n levels, where said levels of said shift register, when reaching said predetermined voltage limit, supply sequentially said control signals for said short-circuit switches.

10. The charge/discharge protection circuit of claim 1, wherein each of said switch segments of said short-circuit switch has associated with it a voltage detector, which delivers a signal at the output of said voltage detector when the voltage at said switch segment disappears as a result of the melting of the respective, associated fusible link.

11. The charge/discharge protection circuit of claim 10, wherein the outputs of said voltage detectors are coupled to a logic circuit comprising a clock generator, and where said logic circuit, when exceeding said predetermined voltage limit, produces said control signal for the next in line switch segment only when the voltage detector of the preceding switch segment delivers an output signal.

12. The charge/discharge protection circuit of claim 1, wherein said switch segments comprise two in series connected, parallel controlled single switches.

13. The charge/discharge protection circuit of claim 1, wherein, with the exception of capacitors, all circuit components are integrated on a chip.

14. A charge/discharge protection circuit for a battery comprising:
   a protection circuit having a first, a second, a third, and a fourth terminal, where said first and said second terminal are coupled to the battery terminals of at least one rechargeable cell, respectively, where said second and said third terminal couples to the charge/discharge terminals of an external device, and where said fourth terminal couples to a buffer capacitor, said protection circuit protecting said rechargeable cell from an over-voltage applied at said battery terminals, said protection circuit further comprising:
      n series circuits coupled in parallel, each of said n series circuits comprising a fusible link and a load current switch, where the commoned fuse end is coupled to said first terminal, where the commoned load current switch end is commoned and coupled via a current sensing means to said third terminal, the junction between each fusible link and load current switch labeled node T, such that there are n T nodes, ranging from 1 to n, one for each of the n series circuits, where each of said n fusible links and each of said n load current switches is designed for a fraction 1/n of the nominal current flowing through said third terminal;

n short-circuit switches, ranging in number from 1 to n, each of said short-circuit switches coupled between said second terminal and its respective, associated node T, 1 to n, such that short-circuit switches 1, 2, 3, . . . n are coupled to node T 1, 2, 3, . . . n, respectively, said short-circuit switch 1 to n short-circuiting its respective, associated fusible link 1 to n, respectively, to permanently separate said rechargeable cell from said third terminal;

a control logic coupled between said second terminal and said third terminal, said control logic, where said control logic opens or closes said load current switches depending on the magnitude of the voltage between said first terminal and said second terminal, the voltage at said charge/discharge terminals, and further depending on the charge or discharge current at said third terminal, said control logic further opening or closing said short-circuit switches depending on an over-voltage signal received by an over-voltage detector, said control logic further comprising;

a current over-discharge detector coupled across the terminals of said current sense means, wired to produce at its output a signal when the maximum allowable discharge current is reached;

a current over-charge detector coupled across the terminals of said current sense means, wired to produce at its output a signal when the maximum allowable charge current is reached;

said over-voltage detector creating for each of said short-circuit switches, 1 to n, in sequential succession control signals, ranging in numbers from 1 to n, to control said short-circuit switches; and a first and a second semiconductor switch coupled in series between said second and said third terminal, said first and said second semiconductor switched conductively by said over-voltage detector (OVD) when said over-voltage detector reaches a predetermined voltage limit.

15. The charge/discharge protection circuit of claim 14, wherein said over-voltage detector receives as input potential the voltage at said second and said third charge/discharge terminals.

16. The charge/discharge protection circuit of claim 14, wherein at least those circuits components of said control logic which generate said control signals for said short-circuit switches receive, via said fourth terminal, their supply voltage from an auxiliary voltage source.

17. The charge/discharge protection circuit of claim 16, wherein said auxiliary voltage source is charged via a third semiconductor switch to the battery voltage, where said third semiconductor switch opens when the battery voltage falls below a predetermined value.

18. The charge/discharge protection circuit of claim 17, wherein said third semiconductor switch opens when said over-voltage detector produces control signals upon exceeding said predetermined voltage limit.

19. The charge/discharge protection circuit of claim 17, wherein said auxiliary voltage source is charged via a charge pump to the maximum allowable gate voltage for said control logic.

20. The charge/discharge protection circuit of claim 17, wherein said auxiliary voltage source is a buffer capacitor.

21. The charge/discharge protection circuit of claim 14, wherein said over-voltage detector comprises a bistable flip-flop circuit which switches from a first stable state to a second stable state when said predetermined voltage limit is reached.

22. The charge/discharge protection circuit of claim 14, wherein said over-voltage detector is coupled to a clock generator followed by a shift register, of at least n levels, where said levels of said shift register, when reaching said predetermined voltage limit, supply sequentially said control signals for said short-circuit switches.

23. The charge/discharge protection circuit of claim 14, wherein each of said short-circuit switches has associated with it a voltage detector, which delivers a signal at the output of said voltage detector when the voltage at said short-circuit switches disappears as a result of the melting of said respective, associated fusible link.

24. The charge/discharge protection circuit of claim 23, wherein the outputs of said voltage detectors are coupled to a logic circuit comprising a clock generator, and where said logic circuit, when exceeding said predetermined voltage limit, produces said control signal for the next in line short-circuit switch only when the voltage detector of the preceding short-circuit switch delivers an output signal.

25. The charge/discharge protection circuit of claim 14, wherein each of said short-circuit switches comprises two in series connected, parallel controlled single switches.

26. The charge/discharge protection circuit of claim 14, wherein, with the exception of capacitors, all circuit components are integrated on a chip.

* * * * *

UNITED STATES PATENT AND TRADEMARK OFFICE
CERTIFICATE OF CORRECTION

PATENT NO.        : 6,687,103 B2  
APPLICATION NO.   : 10/210958  
DATED             : February 3, 2004  
INVENTOR(S)       : Axel Pannwitz It is certified that error appears in the above-identified patent and that said Letters Patent is hereby corrected as shown below:

On the Title Page, Item (73) Assignee
In the Assignees, (73), delete Assignee, "Dialog Semiconductor GmbH, Kirchheim (DE)" and replace with -- Dialog Semiconductor GmbH, Kirchheim/Teck-Nabern (DE) --.

Signed and Sealed this

Twenty-eighth Day of April, 2009

JOHN DOLL  
*Acting Director of the United States Patent and Trademark Office*